US005102733A

United States Patent [19]

Zawadzki

[11] Patent Number: 5,102,733

[45] Date of Patent: Apr. 7, 1992

[54] REPULPABLE PRESSURE-SENSITIVE ADHESIVE CONSTRUCTIONS

[75] Inventor: Mary E. Zawadzki, Long Beach, Calif.

[73] Assignee: Avery Dennison Corporation, Pasadena, Calif.

[21] Appl. No.: 557,409

[22] Filed: Jul. 23, 1990

[51] Int. Cl.[5] .................. B32B 7/12

[52] U.S. Cl. .................. 428/343; 428/355; 428/211; 162/4

[58] Field of Search .................. 428/343, 355

[56] References Cited

U.S. PATENT DOCUMENTS 3,441,430 4/1969 Peterson .................. 428/355 X
3,865,770 2/1975 Blake .................. 428/355 X
4,052,368 10/1977 Larson .................. 428/481 X
4,131,581 12/1978 Coker .................. 428/507 X
4,413,080 11/1983 Blake .................. 428/356 X
4,564,664 1/1986 Change et al. .................. 524/833
4,569,960 2/1986 Blake .................. 428/355 X
4,820,746 4/1989 Rice et al. .................. 525/350 X

*Primary Examiner*—George F. Lesmes
*Assistant Examiner*—D. R. Zirker
*Attorney, Agent, or Firm*—Christie, Parker & Hale

[57] ABSTRACT

A repulpable pressure-sensitive adhesive stock for labels and tapes is provided comprising a paper face material providing a surface active agent and having thereon a discontinuous pattern of a pressure-sensitive adhesive segements. The surface active agent acts to detackify the pressure-sensitive adhesive segment in pulping of the construction to prevent their agglomeration.

21 Claims, No Drawings

REPULPABLE PRESSURE-SENSITIVE ADHESIVE CONSTRUCTIONS

FIELD OF INVENTION

This invention pertains to repulpable pressure-sensitive adhesive paper labels and tape stock.

BACKGROUND OF THE INVENTION

Worldwide concern over the quality of the environment and the need to recycle what was once considered waste is ever-growing. Paper and other cellulose fiber products, such as cardboard, are recyclable and measures exist which remove inks and water-soluble adhesives.

One of the problems with paper and related products is that they also often contain labels having a pressure-sensitive adhesive which have proven difficult to separate from paper fibers under normal pulping conditions. This is because the adhesive tends to agglomerate or stay intact and remain with the paper fibers.

Attention has, in the past, been focused on adhesives for splicing tape used to couple one roll of paper to another. The art has developed very specific water soluble pressure-sensitive adhesives characterized as water dispersible and which, when used, will pass TAPPI Useful Method 213—"Repulpability of Splice Adhesive Compositions" incorporated herein by reference. Such water dispersible adhesives and tapes are described for instance in U.S. Pat. No. 3,441,430 to Peterson; U.S. Pat. No. 3,865,770 to Blake; U.S. Pat. No. 4,052,368 to Larson; U.S. Pat. No. 4,413,080 to Blake; and U.S. Pat. No. 4,569,960 also to Blake, each incorporated herein by reference. The problem with repulpable pressure-sensitive adhesives used in the splicing tapes which are the subject matter of such patents, is that extreme precautions have to be followed in storage and handling of the splicing tapes. The adhesives, for instance, have to be maintained at a controlled constant relative humidity in moisture resistant containers. Otherwise, the adhesive will quickly dry out and lose its tack. While such adhesives are acceptable for the controlled environment of paper manufacture, they are totally unacceptable for general purpose adhesive applications, such as labels which may be applied to cardboard boxes or informational labels applied to correspondence and the like.

There is a need, therefore, to provide a general purpose label and tape construction which is repulpable and wherein the adhesive employed is not sensitive to changes in relative humidity and where no special precautions are required for storage or use of a label or tape.

SUMMARY OF THE INVENTION

It has now been found that a stock for labels and tape which is repulpable can be manufactured from a pulpable cellulosic fiber face stock having thereon a substantially discontinuous pattern of discrete pressure-sensitive adhesive segments and providing as part of the construction an amount of at least one surface active agent sufficient to substantially detackify the pressure-sensitive adhesive segments when the stock undergoes pulping. The surface active agents employed may be ionic, i.e., cationic, or anionic, amphoteric or nonionic, with the presently preferred surface active agent being sodium lauryl sulfate. The amount of functional surface active agent is a quantity greater than 0.5 gram per square meter of paper surface area, preferably greater than 1 gram per square meter. Typical levels are often about 1 to about 10 grams per square meter. For adhesive coat weights of about 4 to about 30 grams per square meter, the ratio of surface active agent to adhesive is generally from about 1:60 to about 1:2.

The pressure-sensitive adhesives applied in a discontinuous pattern may be formed by solvent, bulk and emulsion polymerization including dispersion and suspension polymerization and formed of any combination of polymers and additives which when combined will provide a pressure-sensitive adhesive product having a glass transition temperature less than about 10° C. below use temperature, typically less than about 30° C. below use temperature.

Adhesives may be applied directly or indirectly and depending upon the utility, i.e., whether permanent or removable, can be applied to a level of from about 4 to about 30 grams per square meter using techniques such as spray, wire and gravure print coating.

Adhesive segment size should be sufficient to provide the level of adhesion desired given the application to which the product is to be placed, yet be sufficiently small to enable the provided surface active agent during the pulping of the label stock to substantially detackify the adhesive to prevent agglomeration of adhesive segments.

In general, particles of higher particle size, i.e., particles that are of a relatively large dimension in the plane of the paper will tend to have the greater adhesion than particles of smaller dimension and can be used to control adhesion in that fashion.

DETAILED DESCRIPTION

According to the present invention there is provided a pressure-sensitive adhesive label and tape stock formed of a pulpable cellulosic fiber face material having applied thereon a substantially discontinuous pattern of pressure-sensitive adhesive segments which, upon pulping, will separate into substantially discrete adhesive segments and a surface active agent having an affinity for the pressure-sensitive adhesive provided in a quantity sufficient to substantially detackify the adhesive segments to prevent agglomeration of adhesive segments upon pulping of the paper face stock. This enables clean delineation and/or separation of the detackified pressure-sensitive adhesive segments from the fiber pulp.

By a "surface active agent" there is meant a surfactant or detergent having an affinity for the pressure-sensitive adhesives used in the construction which, in accordance with this invention, is provided as part of the cellulosic fiber or paper face stock and available for release under pulping action to cause substantial detackification of adhesive segments to prevent agglomeration of adhesive segments and permit separation of the adhesive segments from the paper fibers. The surface active agents typically have a HLB value ranging from about 8 to about 40 or more may be ionic, (i.e., cationic, anionic, amphoteric) or nonionic in nature. The presently preferred surfactant is sodium lauryl sulfate. Sodium lauryl sulfate is a foaming anionic surfactant having an HLB value of about 40. Another surfactant especially suitable for elastomer-based adhesive detackification is Pluronic 25R8, a nonionic, low foaming emulsifier formed of condensate of propylene oxide with a hydrophilic base.

By the term "cellulosic fiber face stock" as used in accordance with the invention there is meant cellulosic fiber products consisting of light to heavy paper products including tissue, newsprint, Kraft paper, cardboard stock and the like. The paper can be light weight, such as facial tissue, to heavy fiber stock such as corrugated cardboard manufacture. The paper face stock may be formed of any pulpable cellulosic fiber material, virgin and recycled.

The surface active agent is provided as part of the combination in general, at a ratio of about 1:60 to about 1:2 parts by weight per part by weight adhesive and generally applied in a level of at least 0.5 gram per square meter of face stock surface preferably greater than about 1 gram per square meter of face stock surface and typically in a range of about 1 to about 10 grams per square meter. The surface active agent may be coated on the paper face stock or incorporated into the body of the paper face stock when the paper face stock is manufactured. Preferably, however, the surface active agent is applied as a coating and preferably adjacent the discontinuous pattern of pressure-sensitive adhesive.

As stated, it is required that the pressure-sensitive adhesive be applied as a substantially discontinuous pattern of discrete adhesive segments. The adhesive segments may be contiguous to one another but are sufficiently discrete that under pulping action they are capable of separating from the paper during pulping as in evidential adhesive segments rather than of adhesive masses. Without being bound by theory, it is believed the pressure-sensitive adhesive separates as discrete adhesive segments substantially as applied to the face stock. To this end, the provided surface active agent effectively operates to detackify the pressure-sensitive adhesive segments to prevent segments from agglomerating. The detackified segments may be allowed to remain with liquor or be separated from the pulp. The standard by which the ability of a surfactant to effectively detackify the adhesive or the amount of surfactant required as part of a label combination can be readily determined using TAPPI Useful Method 213 related repulpability of paper splices.

The adhesive segments used as part of the label construction may be of any desirable shape, ranging from hemispheres to bar-shaped and other controlled segments produced by screen and gravure printing to random-shaped segments produced by spraying. Shapes further include inherently tacky, microsphere particles as formed by suspension polymerization. Suspension polymerization is described, for instance, in U.S. Pat. Nos. 3,691,140 to Silver; 4,166,152 to Baker, et al., 4,495,318 and 4,598,212 to Howard; 4,786,696 to Bohnel and 4,810,763 to Mallya, et al. each incorporated herein by reference. Adhesive segments may contact one another but remain discrete and capable by action of the surface active agent of remaining nonagglomerating discrete segments of size sufficiently small to be detackified and separated in washing operations attendant to recovery from paper pulp.

The types of pressure-sensitive adhesives which may be applied as a pattern include acrylic based adhesive, such as adhesives based on alkyl acrylates containing from 4 to about 14 carbon atoms in the alkyl group such as butyl acrylate, and isooctyl acrylate, 2-ethyl hexylacrylate and the like which may be polymerized or copolymerized with one or more modifying monomers. Acrylic base adhesives may be inherently tacky or rendered tacky by the addition of tackifiers or plasticizers. As functional adhesives there may be mentioned products described in U.S. Pat. No. 4,564,664 to Chang, et al., incorporated herein by reference.

Also used as adhesives in accordance with the present invention are elastomeric-based adhesive such as those formed from natural and synthetic rubbers, styrene-isoprene and styrene-butadiene random and block copolymers and the like, especially those which are tackified or plasticized to provide the desired adhesive characteristics. They may be solvent based, hot melt or emulsion adhesives. Such adhesives, for instance, are described in U.S. Pat. No. 4,820,746 to Rice, et al., incorporated herein by reference.

Other pressure-sensitive adhesives may be used.

The pressure-sensitive adhesives may be provided by solvent, emulsion, and bulk polymerization as well as dispersion and suspension polymerization.

There is no limit to the techniques which can be used for the adhesive application nor the nature of the adhesives applied to make permanent or removable adhesives used in label and tape stock. It is generally accepted that for general purpose paper label and tape applications, adhesives are applied typically to a coat weight of about 4 to about 30 grams per square meter. The discontinuous adhesive coat level for a given application will be less than that for a continuous coating to enable the particles to remain discrete in order to be detackified by the surface active agent. Lower coat weights can be compensated for by providing an adhesive having increased aggressiveness by selection of monomers and/or selection and levels of tackifiers.

Generally, the adhesive aggressiveness will also increase with particle size and it is presently contemplated that individual segment size can range from, in maximum dimension in the plane surface of the paper face stock, about 20 to about 250 microns with a segment height of at least about 10 microns.

The presently preferred method of producing label stock is to coat as provided paper with an aqueous solution of surface active agent and to apply over that dried coating a substantially discontinuous pattern of adhesive segments by conventional techniques, including direct application and transfer from a release surface. Particle thickness should be that accepted with normal adhesive label and tape use for application to a paper or cardboard substrate and other substrates which are to be labeled. The following examples illustrate the invention. The controls describe nonoperative comparative evaluations. In the Examples, the following test methods were used to determine adhesive properties: 180° Peel PSTC (Pressure Sensitive Test Council) Test No. 1, 9th Ed.; 90° Peel PSTC No. 2, 5th Ed; Looptack PSTC No. 5, 6th Ed.; wherein ss=stainless steel, cb=cardboard, pe=polyethylene, N/m=Newtons per meter.

EXAMPLE 1

A paper face stock (DSX) was coated with a Pluronic 25R8 to a level of at least 3 grams per square meter. This was spray coated with a discontinuous spray coat of a commercial acrylic emulsion pressure-sensitive adhesive. A 1"×8" strip of the pressure-sensitive adhesive product was evaluated using TAPPI UM 213 (neutral water). No adhesive agglomerates formed. A 3 gram sample of this construction was repulped in 100 milliliters of water. Again, no adhesive agglomerates formed. A portion of the pulp slurry was partially dried and then examined under the optical microscope. No adhesive agglomerates were found, and the pulp could be pulled apart easily throughout the whole sample. The sample was fully dried and then reexamined. Again, no agglomerates could be seen.

EXAMPLE 2

A sheet of Chambril EDP paper face material was coated with a 10 percent by weight solution of sodium lauryl sulfate by pouring a line of the sodium lauryl sulfate solution on the paper, then smoothing the solution down with a Number 15 Meyer bar. The coating was dried in a 70° C. oven for ten minutes. A 60 percent by weight emulsion of suspension microspheres, prepared according to U.S. Pat. No. 4,810,763 and having a size of about 35 to 50 microns, was coated onto a release surface using the Meyer bar. Care was taken to obtain even coverage and any thick spots were urged to the end. After drying the emulsion for ten minutes at 70° C., the microspheres were laminated to the sodium lauryl sulfate coated side of the paper face stock and the release liner pulled away. Paper segments containing thick adhesive were cut off, as were any segments which had not been coated with sodium lauryl sulfate. The remainder of the construction, which weighed about 15 grams, was cut into $\frac{1}{2}'' \times \frac{1}{2}''$ squares according to TAPPI UM 213. Five hundred milliliters of distilled water were added to the Waring blender along with the square and blended high shear for 30 seconds. The blender was turned off, the sides of the blender were scraped down, and two more 30 second pulping cycles were repeated. A substantial amount of foam was generated. No agglomeration of adhesive microspheres was formed. The paper fibers appeared individual. On pouring the mixture into a Buchner funnel, the individuality of the fibers became apparent and they were free of adhesive globs. Table 1 shows the adhesive properties of the product. A sample was aged seven days in a 70° C. oven. It remained tacky. The adhesive did not discolor or bleed into the face stock.

EXAMPLE 3

The procedure of Example 2 was repeated using as the surface active agent Pluronic 25R8, a nonionic low foaming surfactant. The product pulped reasonably well, although some soft lumps were formed.

Control 1

The procedure of Example 2 was substantially repeated except that the coating applied to the paper was a mixture of starch and ethylene vinyl alcohol, a nonsurfactant water soluble coating. Pulping was poor, and tacky sheets and blocks of the microspheres were formed.

Control 2

The procedure of Example 2 was repeated except that there was applied a multilayer of the microspheres of polymer. This resulted in a product having multiple layers of microspheres which was not discontinuous in many places. Although there was some degree of acceptable pulping, many of the adhesive masses agglomerated indicating the need for a substantially discontinuous layer of adhesive.

Control 3

The procedure of Example 2 was repeated except that a coating of sodium lauryl sulfate was not applied to the paper. What was formed was a label stock which was poorly pulped with lumps of agglomerated adhesive being formed.

EXAMPLE 4

The procedure of Example 2 was repeated except that the adhesive employed was a commercial hot-melt tackified elastomeric adhesive dissolved in toluene which was sprayed onto a sodium lauryl sulfate coated paper. Pulping was excellent with no lumps of agglomerated adhesive being formed.

Control 4

The procedure of Control 3 was repeated except there was employed the hot-melt adhesive as described in Example 4. Because of the absence of a surface active agent, paper samples, upon pulping, yielded masses of agglomerated adhesive segments.

EXAMPLE 5

The procedure of Example 2 was repeated except that the solution of sodium lauryl sulfate was squeegee coated onto the paper and an acrylic emulsion pressure-sensitive adhesive was sprayed onto paper containing the sodium lauryl sulfate with an air-driven paint sprayer, forming a discontinuous pattern of adhesive segments. The segments were typically of a particle size 90 to about 150 microns and quite closely packed, with some segments overlapping. The product pulped well, with no agglomerates of adhesive forming. Adhesive coat was low and properties are shown in Table 1.

Control 5

The procedure of Example 2 was repeated except there was used as the surface active agent a 9 percent by weight aqueous solution of Tetronic 707 which was mixed with a continuous adhesive as opposed to a discontinuous layer of adhesive segments. The product could not be pulped without the formation of agglomerates. The same proved to be true when the surfactant was applied separately to the face stock and when a Tetronic 707 nonionic surfactant also having an HLB value greater than 24 was applied. Substituting Triton X165 did not enable successful pulping, when the adhesive film formed was a continuous film.

Control 6

There were obtained two commercial production samples, both employing an acrylic pressure-sensitive adhesive, one of which being the same as that employed in Example 4, but where the surface active agent was not applied to the paper, and where the adhesive was applied as a continuous film. In both instances, the samples could not be successfully pulped as many agglomerates formed.

EXAMPLE 6

The procedure of Example 2 was essentially repeated except that the sodium lauryl sulfate solution was applied to the side of the paper opposite to the side to which the suspension microspheres were applied. The product could be successfully repulped.

EXAMPLE 7

The procedure of Example 2 was repeated except that the surfactant used was Pluronic 25R8. The adhesive was the adhesive of Example 3 applied as a 25 percent solids solution in toluene and in a discontinuous pattern of an adhesive by spray coating. The product was formed and pulped well, with no identifiable globs of adhesive being formed.

EXAMPLE 8

Chambril EDP paper was squeegee coated with sodium lauryl sulfate to a coat weight of 2.4 grams per square meter. A commercial emulsion acrylic adhesive was spray applied with an air driven paint sprayer to a coat weight of 14.4 grams per square meter. The coat was more dense than in Example 5 but still discontinuous. As in Example 1, a portion of the product was pulped in accordance with TAPPI UM 213. It pulped well with no adhesive agglomerates being present. Another sample was pulped with the same result. Another sample was tested for adhesive properties. This proved to be a permanent adhesive by accepted standards. The results are shown in Table 1.

TABLE 1

| Property | Ex. 1 | Ex. 5 | Ex. 8 |
|---|---|---|---|
| 180° peel, ss(N/m) | 157.0 | 276 | face stock tore |
| 180° peel, cb(N/m) | 160.1 | 218 | cb tore |
| 90° peel, ss(N/m) | 74.8 | 118 | — |
| Looptack, ss(N/m) | 40.7 | 144 | 256 |
| Looptack, cb(N/m) | 57.7 | 23.6 | 182 |
| Looptack, pe(N/m) | 32.8 | 26.2 | — |

What is claimed is:

1. A repulpable pressure-sensitive adhesive stock which comprises:

a) a backing formed of repulpable cellulosic fibers and providing opposed backing surfaces;

b) a tacky pressure-sensitive adhesive layer provided on at least one surface of the backing, said pressure-sensitive adhesive layer formed of a substantially discontinuous pattern of discrete water insoluble pressure-sensitive adhesive segments; and c) at least one surface active agent selected from the group consisting of surfactants and detergents provided by the backing, said surface active agent having an affinity for the pressure-sensitive adhesive and provided in quantity sufficient to detackify the discrete pressure-sensitive adhesive segments to prevent agglomeration of the pressure-sensitive adhesive segments upon pulping of the backing.

2. A repulpable pressure-sensitive adhesive stock as claimed in claim 1 in which the pressure-sensitive adhesive segments have a dimension in the plane of the surface of the backing of from about 20 to about 250 microns.

3. A repulpable pressure-sensitive adhesive stock as claimed in claim 1 in which the surface active agent is present in an amount of at least 0.5 gram per square meter of backing surface.

4. A repulpable pressure-sensitive adhesive stock as claimed in claim 2 in which the surface active agent is present in an amount of at least 0.5 gram per square meter of backing surface.

5. A repulpable pressure-sensitive adhesive stock as claimed in claim 1 in which the surface active agent is present in an amount of at least 1 gram per square meter of backing surface.

6. A repulpable pressure-sensitive adhesive stock as claimed in claim 2 in which the surface active agent is present in an amount of at least 1 gram per square meter of backing surface.

7. A repulpable pressure-sensitive adhesive stock as claimed in claim 1 in which the surface active agent is present in an amount of from about 1 to about 10 grams per square meter of backing surface.

8. A repulpable pressure-sensitive adhesive stock as claimed in claim 2 in which the surface active agent is present in an amount of from about 1 to about 10 grams per square meter of backing surface.

9. A repulpable pressure-sensitive adhesive stock as claimed in claim 1 in which the pressure-sensitive adhesive is present in an amount of from about 4 to about 30 grams per square meter of backing surface, and the weight ratio of surface active agent to pressure-sensitive adhesive is from about 1:60 to about 1:2.

10. A repulpable pressure-sensitive adhesive stock as claimed in claim 2 in which the pressure-sensitive adhesive is present in an amount of from about 4 to about 15 grams per square meter of backing surface, and the weight ratio of surface active agent to pressure-sensitive adhesive is from about 1:60 to about 1:2.

11. A repulpable pressure-sensitive adhesive stock as claimed in claim 1 in which the surface active agent is sodium lauryl sulfate.

12. A repulpable pressure-sensitive adhesive stock as claimed in claim 2 in which the surface active agent is sodium lauryl sulfate.

13. A repulpable pressure-sensitive adhesive stock as claimed in claim 7 in which the surface active agent is sodium lauryl sulfate.

14. A repulpable pressure-sensitive adhesive stock as claimed in claim 10 in which the surface active agent is sodium lauryl sulfate.

15. A repulpable pressure-sensitive adhesive stock as claimed in claim 1 in which the pressure-sensitive adhesive comprises inherently tacky microspheres.

16. A repulpable pressure-sensitive adhesive stock as claimed in claim 2 in which the pressure-sensitive adhesive comprises inherently tacky microspheres.

17. A repulpable pressure-sensitive adhesive stock as claimed in claim 1 in which the pressure-sensitive adhesive comprises an acrylic polymer prepared by emulsion polymerization.

18. A repulpable pressure-sensitive adhesive stock as claimed in claim 2 in which the pressure-sensitive adhesive comprises is acrylic polymer prepared by emulsion polymerization.

19. A repulpable pressure-sensitive adhesive stock as claimed in claim 1 in which the pressure-sensitive adhesive comprises a tackified elastomeric polymer.

20. A repulpable pressure-sensitive adhesive stock as claimed in claim 2 in which the pressure-sensitive adhesive comprises a tackified elastomeric polymer.

21. A pressure-sensitive adhesive as claimed in claim 20 in which the surface active agent is nonionic condensate of propylene oxide with a hydrophilic base.

* * * * *

UNITED STATES PATENT AND TRADEMARK OFFICE

CERTIFICATE OF CORRECTION

PATENT NO. : 5,102,733

DATED : April 7, 1992

INVENTOR(S) : Mary E. Zawadzki

It is certified that error appears in the above-identified patent and that said Letters Patent is hereby corrected as shown below:

Title page, item

[56] References Cited, U.S. PATENT DOCUMENTS, change "4,564,664 1/1986 Change et al." to -- 4,564,664 1/1986 Chang et al --.

Abstract, line 5, change "segements" to -- segments --.

Column 1, line 5, before "INVENTION" insert -- THE --.
Column 2, line 59, before "HLB" change "a" to -- an --.
Column 2, line 60, after "ionic" delete the comma.
Column 3, line 5, change "light weight" to -- lightweight --.
Column 4, line 5, change "adhesive" to -- adhesives --.

In the Claims:

Column 8, line 51, before "acrylic" change "is" to -- an --.

Signed and Sealed this

Twenty-fourth Day of August, 1993

Attest:

BRUCE LEHMAN

Attesting Officer

Commissioner of Patents and Trademarks